(12) United States Patent
Lee et al.

(10) Patent No.: US 12,100,392 B2
(45) Date of Patent: *Sep. 24, 2024

(54) DECODING METHOD AND APPARATUS IN ARTIFICIAL NEURAL NETWORK FOR SPEECH RECOGNITION

(71) Applicant: Samsung Electronics Co., Ltd., Suwon-si (KR)

(72) Inventors: Min-Joong Lee, Suwon-si (KR); Tae Gyoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,876

(22) Filed: May 23, 2023

(65) Prior Publication Data

US 2023/0306961 A1    Sep. 28, 2023

Related U.S. Application Data

(63) Continuation of application No. 16/844,401, filed on Apr. 9, 2020, now Pat. No. 11,694,677.

(30) Foreign Application Priority Data

Jul. 31, 2019   (KR) .......................... 10-2019-0093066

(51) Int. Cl.
   *G10L 15/16*   (2006.01)
(52) U.S. Cl.
   CPC .................................. *G10L 15/16* (2013.01)

(58) Field of Classification Search
   CPC ....... G10L 15/16; G10L 15/183; G10L 15/02; G10L 15/063; G10L 15/26; G10L 19/00; G06N 3/0445; G06N 3/0454; G06N 3/08
   See application file for complete search history.

(56) References Cited

U.S. PATENT DOCUMENTS

8,484,022 B1   7/2013   Vanhoucke
8,886,579 B2   11/2014  De Sousa Webber
(Continued)

FOREIGN PATENT DOCUMENTS

CN   108615525 A   10/2018
JP   2008-210206 A   9/2008
(Continued)

OTHER PUBLICATIONS

Hinton et al., "Deep Neural Networks for Acoustic Modeling in Speech Recognition," Apr. 27, 2012, 27 pages.
(Continued)

*Primary Examiner* — Abdelali Serrou
(74) *Attorney, Agent, or Firm* — NSIP Law

(57) ABSTRACT

A decoding method and apparatus in an artificial neural network for speech recognition. The decoding method in the artificial neural network for speech recognition includes performing a first decoding task of decoding a feature including speech information and at least one token recognized up to current time, using a shared decoding layer included in the artificial neural network, performing a second decoding task of decoding the at least one token, using the shared decoding layer, and determining an output token to be recognized subsequent to the at least one token based on a result of the first decoding task and a result of the second decoding task.

14 Claims, 10 Drawing Sheets

(56) References Cited

U.S. PATENT DOCUMENTS

| | | | |
|---|---|---|---|
| 9,460,711 | B1 | 10/2016 | Vanhoucke et al. |
| 9,666,184 | B2 | 5/2017 | Lee et al. |
| 10,210,860 | B1 | 2/2019 | Ward et al. |
| 10,629,193 | B2 * | 4/2020 | Ye .......................... G10L 15/16 |
| 10,679,612 | B2 | 6/2020 | Lee et al. |
| 10,909,157 | B2 * | 2/2021 | Paulus ................. G06F 18/214 |
| 11,100,916 | B2 | 8/2021 | Lee |
| 11,210,565 | B2 * | 12/2021 | Li .......................... G10L 15/16 |
| 11,482,212 | B2 * | 10/2022 | Kim .................... G10L 15/1815 |
| 2014/0358539 | A1 | 12/2014 | Rao et al. |
| 2016/0155049 | A1 | 6/2016 | Choi |
| 2016/0163310 | A1 | 6/2016 | Lee et al. |
| 2016/0171974 | A1 | 6/2016 | Hannun et al. |
| 2016/0210551 | A1 * | 7/2016 | Lee ......................... G10L 15/16 |
| 2016/0365090 | A1 | 12/2016 | Nissan |
| 2017/0025117 | A1 | 1/2017 | Hong |
| 2017/0053652 | A1 | 2/2017 | Choi et al. |
| 2017/0148433 | A1 | 5/2017 | Catanzaro et al. |
| 2017/0229115 | A1 | 8/2017 | Lee et al. |
| 2018/0032871 | A1 | 2/2018 | Holt et al. |
| 2018/0129972 | A1 | 5/2018 | Chen et al. |
| 2018/0190267 | A1 | 7/2018 | Cheluvaraja et al. |
| 2018/0261225 | A1 | 9/2018 | Watanabe et al. |
| 2018/0336884 | A1 | 11/2018 | Sriram et al. |
| 2018/0336887 | A1 | 11/2018 | Song et al. |
| 2019/0057683 | A1 | 2/2019 | Sak et al. |
| 2019/0122651 | A1 | 4/2019 | Arik et al. |
| 2020/0125944 | A1 * | 4/2020 | Jauhar ..................... G06F 40/40 |

FOREIGN PATENT DOCUMENTS

| | | |
|---|---|---|
| KR | 10-2012-0048139 A | 5/2012 |
| KR | 10-2016-0133349 A | 11/2016 |
| KR | 10-2017-0022445 A | 3/2017 |
| WO | WO 2018/077244 A1 | 5/2018 |

OTHER PUBLICATIONS

Chan et al., "Listen, Attend and Spell," Aug. 20, 2015, 16 pages.

Tjandra et al., "Listening while speaking: Speech chain by deep learning," Jul. 16, 2017, 16 pages.

Prabhavalkar et al., "Minimum Word Error Rate Training for Attention-Based Sequence-To-Sequence Models," Dec. 5, 2017, 5 pages.

Kannan et al., "An analysis of incorporating an external language model into a sequence-to-sequence model," Dec. 6, 2017, 5 pages.

EESR dated Dec. 10, 2020 issued in counterpart European Patent Application No. 20181967.9 (7 pages in English).

Toshniwal, Shubham, et al. "A Comparison of Techniques for Language Model Integration in Encoder-Decoder Speech Recognition." *2018 IEEE spoken language technology workshop (SLT)*. IEEE, 2018 (7 pages in English).

Kannan, Anjuli, et al. "An Analysis of Incorporating an External Language Model Into a Sequence-To-Sequence Model." 2018 IEEE International Conference on Acoustics, Speech and Signal Processing (ICASSP). IEEE, arXiv:1712.01996v1 [eess.AS] Dec. 6, 2017, (5 pages).

Toshniwal, Shubham, et al. "A Comparison of Techniques for Language Model Integration in Encoder-Decoder Speech Recognition." 2018 IEEE spoken language technology workshop (SLT). IEEE, 2018, (7 pages).

Chinese Office Action issued on Oct. 11, 2023, in counterpart Chinese Patent Application No. 202010361194.3 (22 pages in English, 15 pages in Chinese).

* cited by examiner

DECODING METHOD AND APPARATUS IN ARTIFICIAL NEURAL NETWORK FOR SPEECH RECOGNITION

CROSS-REFERENCE TO RELATED APPLICATIONS

This application is a continuation of U.S. patent application Ser. No. 16/844,401 filed on Apr. 9, 2020, which claims the benefit under 35 USC § 119(a) of Korean Patent Application No. 10-2019-0093066 filed on Jul. 31, 2019, in the Korean Intellectual Property Office, the entire disclosure of which is incorporated herein by reference for all purposes.

BACKGROUND

1. Field

The following description relates to a decoding method and apparatus in an artificial neural network for speech recognition.

2. Description of Related Art

Speech recognition refers to technology for recognizing or understanding an acoustic speech signal such as a speech sound uttered by a human being by analyzing the acoustic speech signal with a computing device. Speech recognition has been traditionally performed mainly using a hidden Markov model (HMM) to recognize a speech sound based on a frequency characteristic extracted from speech data. Such an HMM-based speech recognition method may recognize the speech sound by analyzing a pronunciation from the speech data and combining words or sentences based on the analyzed pronunciation.

However, with the development of a deep learning-based machine learning method, there is ongoing research on end-to-end speech recognition technology that directly recognizes, using an acoustic model constructed as an artificial neural network, a text such as a word and a sentence from speech data without analyzing a pronunciation from the speech data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a decoding method in an artificial neural network for speech recognition includes performing a first decoding task of decoding a feature including speech information and at least one token recognized up to a current point in time, using a shared decoding layer included in the artificial neural network, performing a second decoding task of decoding the at least one token using the shared decoding layer, and determining an output token to be recognized subsequent to the at least one token based on a result of the first decoding task and a result of the second decoding task.

The performing of the first decoding task may include adjusting, to be a first value, a weight of a synapse connecting the shared decoding layer and a neuron corresponding to the feature. The performing of the second decoding task may include adjusting the weight of the synapse to be a second value.

The performing of the first decoding task may include performing the first decoding task by inputting, to the shared decoding layer, the feature and the at least one token recognized up to the current point. The performing of the second decoding task may include performing the second decoding task by inputting, to the shared decoding layer, the at least one token recognized up to the current point.

The performing of the first decoding task may include inputting, to a first pre-decoding layer, the feature and the at least one token recognized up to the current point, and inputting an output of the first pre-decoding layer to the shared decoding layer to perform the first decoding task. The performing of the second decoding task may include inputting, to a second pre-decoding layer, the at least one token recognized up to the current point, and inputting an output of the second pre-decoding layer to the shared decoding layer to perform the second decoding task.

The performing of the first decoding task may include inputting, to the shared decoding layer, the feature and the at least one token recognized up to the current point, and inputting an output of the shared decoding layer to a first post-decoding layer to perform the first decoding task. The performing of the second decoding task may include inputting, to the shared decoding layer, the at least one token recognized up to the current point, and inputting an output of the shared decoding layer to a second post-decoding layer to perform the second decoding task.

The result of the first decoding task may include first probabilities of candidates for the output token. The result of the second decoding task may include second probabilities of the candidates for the output token.

The determining of the output token may include calculating a weighted sum of the first probabilities and the second probabilities, and determining, to be the output token, a candidate corresponding to a maximum weighted sum among the candidates.

The decoding method may further include determining the output token to be a subsequent input token.

The feature may be determined using an attention network based on sequence vectors associated with a progress of the speech information.

The decoding method may further include generating the feature by encoding the speech information using an encoding layer included in the artificial neural network.

In another general aspect, a training method of an artificial neural network for speech recognition includes selecting at least one sample from a batch including a first training set including a pair of a speech and a text corresponding to the speech and a second training set including a text, training an encoding layer and a shared decoding layer that are included in the artificial neural network based on the sample in response to the sample being selected from the first training set, and training the shared decoding layer based on the sample in response to the sample being selected from the second training set.

The training of the encoding layer and the shared decoding layer may include extracting, using the encoding layer, a feature from a speech included in the sample, estimating, using the shared decoding layer, an output token to be recognized subsequent to at least one token based on the extracted feature and the at least one token, and training the encoding layer and the shared decoding layer based on the estimated output token and at least a portion of a text corresponding to the speech included in the sample.

The training of the shared decoding layer may include estimating, using the shared decoding layer, an output token to be recognized subsequent to at least one token based on the at least one token, and training the shared decoding layer based on the estimated output token and at least a portion of a text included in the sample.

The selecting of the sample from the first training set may include extracting, using the encoding layer, a feature from a speech included in the sample, estimating, using the shared decoding layer, first probabilities of candidates for an output token to be recognized subsequent to at least one token based on the extracted feature and the at least one token, estimating, using the shared decoding layer, second probabilities of the candidates for the output token to be recognized subsequent to the at least one token based on the at least one token, estimating the output token based on a weight between the first probabilities and the second probabilities, and learning the weight based on at least a portion of a text corresponding to the speech included in the sample.

In another general aspect, a speech recognition apparatus includes an encoder configured to generate a feature from speech information, and a decoder configured to, using a shared decoding layer, perform a first decoding task of decoding the feature and at least one token recognized up to a current point in time, perform a second decoding task of decoding the at least one token recognized up to the current point, and determine an output token to be recognized subsequent to the at least one token based on a result of the first decoding task and a result of the second decoding task.

The speech recognition apparatus may further include a speech preprocessor configured to extract a speech feature vector from the speech information, and the encoder may generate the feature based on the speech feature vector.

The decoder may perform the first decoding task by adjusting, to be a first value, a weight of a synapse connecting the shared decoding layer and a neuron corresponding to the feature, and perform the second decoding task by adjusting the weight of the synapse to be a second value.

The decoder may perform the first decoding task by receiving, through the shared decoding layer, the feature and the at least one token recognized up to the current point, and perform the second decoding task by receiving, through the shared decoding layer, the at least one token recognized up to the current point.

The decoder may perform the first decoding task by receiving the feature and the at least one token recognized up to the current point through a first pre-decoding layer, and receiving an output of the first pre-decoding layer through the shared decoding layer. In addition, the decoder may perform the second decoding task by receiving the at least one token recognized up to the current point through a second pre-decoding layer, and receiving an output of the second pre-decoding layer through the shared decoding layer.

The decoder may perform the first decoding task by receiving the feature and the at least one token recognized up to the current point through the shared decoding layer, and receiving an output of the shared decoding layer through a first post-decoding layer. In addition, the decoder may perform the second decoding task by receiving the at least one token recognized up to the current point through the shared decoding layer, and receiving an output of the shared decoding layer through a second post-decoding layer.

The result of the first decoding task may include first probabilities of candidates for the output token. The result of the second decoding task may include second probabilities of the candidates for the output token.

The decoder may calculate a weighted sum of the first probabilities and the second probabilities, and determine, to be the output token, a candidate corresponding to a maximum weighted sum among the candidates.

The decoder may determine the output token to be a subsequent input token.

The feature may be determined using an attention network based on sequence vectors associated with a progress of the speech information.

In another general aspect, a speech recognition apparatus includes an encoder configured to receive a speech feature vector corresponding to speech information and output a context vector; and a decoder configured to receive the context vector; decode the context vector and a most recently recognized token using a shared decoding layer included in an artificial neural network to output a first result; decode only the most recently recognized token using the shared decoding layer to output a second result; and output a current token based on the first result and the second result.

The decoder may be configured to decode the context vector and the most recently recognized token using a speech recognition task of the shared decoding layer.

The decoder may be configured to decode only the most recently recognized token using a language model task of the shared decoding layer.

The decoder may be entirely configured by the shared decoding layer.

Only a portion of the decoder may be configured by the shared decoding layer.

Other features and aspects will be apparent from the following detailed description, the drawings, and the claims.

Figure 1:
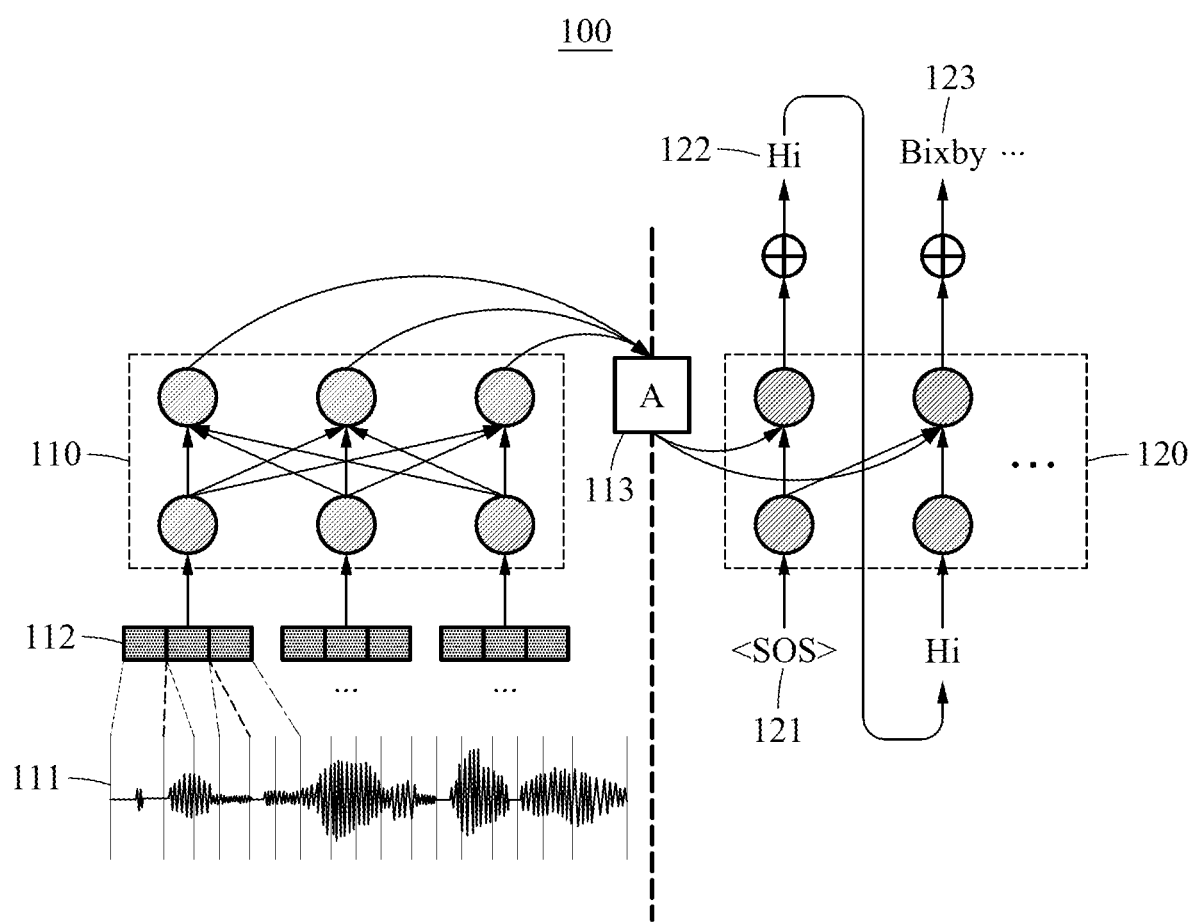
FIG. 1 illustrates an example of operating an artificial neural network for speech recognition.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of the examples, detailed description of structures or functions that are thereby known after an understanding of the disclosure of the present application will be omitted when it is deemed that such description will cause ambiguous interpretation of the examples.

Hereinafter, examples will be described in detail with reference to the accompanying drawings, and like reference numerals in the drawings refer to like elements throughout.

FIG. 1 illustrates an example of operating an artificial neural network for speech recognition.

Referring to FIG. 1, an artificial neural network 100 for speech recognition may be embodied by a sequence-to-sequence model. The sequence-to-sequence model may output a sequence of a different domain from an input sequence. For example, the artificial neural network 100 embodied in a sequence-to-sequence structure for speech recognition may directly generate, from an input speech, a text corresponding to the input speech which is a recognition result corresponding to the input speech. The artificial neural network 100 may be trained in advance to generate a sequence of a recognition result from an input sequence. For example, the artificial neural network 100 may be trained to increase a correlation between a speech and a text using training data including a speech and a text corresponding to the speech.

As illustrated, the sequence-to-sequence model includes an encoder 110 and a decoder 120. The encoder 110 may not directly receive and process speech information 111, but receive a speech feature vector 112 obtained through conversion into a vector form corresponding to the speech information 111. The encoder 110 may sequentially receive the speech feature vector 112, and then compress all sets of speech information at the end to form a single vector, which is referred to as a context vector 113. The context vector 113 may also be referred to as a feature or an encoded feature including speech information. When the speech information 111 based on a lapse of time is compressed into the single context vector 113, the encoder 110 may transmit the context vector 113 to the decoder 120. The decoder 120 may receive the context vector 113, and sequentially output recognized words one by one.

The encoder 110 and the decoder 120 may be embodied by a neural network, for example, a recurrent neural network (RNN). The encoder 110 may be an RNN configured to receive a sequence, for example, a speech, as an input. The decoder 120 may be an RNN configured to output a sequence, for example, a text which is a result of recognizing the speech. The encoder 110 and the decoder 120 may also be embodied by, for example, a deep neural network (DNN), a recurrent deep neural network (RDNN), and the like, in addition to the RNN.

The decoder 120 may perform autoregressive decoding. The autoregressive decoding may be a decoding method to determine an output token based on tokens recognized up to a previous step for each token, and used to calculate an output of an undefined length by an artificial neural network.

In the example of FIG. 1, the decoder 120 receiving the context vector 113 receives, as an initial input, a start token, or a start-of-sentence (SOS) 121, which indicates a start of a sentence. The decoder 120 receiving the SOS 121 predicts a token that is highly likely to appear subsequently. A token used herein indicates a unit forming one sequence, and the unit may include, for example, a word, a subword, or a character. Hereinafter, a token will be described as a word unit for convenience of description. In a first time step, the decoder 120 predicts a word, "Hi" 122, to appear subsequently. That is, the decoder 120 determines "Hi" 122 to be an output token, and outputs the output token as a speech recognition result. The decoder 120 determining "Hi" 122 to be the output token inputs "Hi" 122 as an input for a subsequent time step. In a second time step, the decoder 120 predicts a word 123, "Bixby," to appear subsequently from the input word "Hi" 122. The decoder 120 then inputs "Bixby" as an input for a subsequent time step. The decoder 120 may predict a word to follow subsequently as described above, and input the predicted word as an input for a subsequent time step. The decoder 120 may repeat such operation until an end token, or an end-of-sentence (EOS), which indicates an end of a sentence, is predicted as a subsequent word.

The decoder 120 may obtain an output token based on information calculated from the encoder 110 in each step, and the output token may be obtained dependently on input tokens selected up to a previous step. For example, the decoder 120 receiving token 1 may predict probabilities of candidates for an output token based on the received token 1, and determine the output token based on the probabilities. In this example, the decoder 120 may select, to be the output token, a candidate having a greatest probability from among the candidates.

A conditional probability of a token candidate $t_i$ in a step i may be represented by Equation 1.

$$p(t_i|t_1, t_2, \ldots, t_{i-1}, H_e) \quad \text{[Equation 1]}$$

In Equation 1, $H_e$ denotes a hidden representation of the encoder 110 that corresponds to the context vector 113, and $t_1$ through $t_i-1$ indicate tokens recognized up to a current point in time. The decoder 120 may determine a subsequent output token based on the context vector 113 and the tokens recognized up to the current point. The context vector 113 may be determined using an attention network based on speech feature vectors associated with a progress of the speech information 111. Since different information may be needed for each word when the decoder 120 determines an output token, using a same context vector in each time step may degrade performance in speech recognition.

For example, using the attention network, when the decoder 120 determines an output token $t_i$ the decoder 120 may use different context vectors for each $t_i$ by a combination of hidden state vectors $h_1, h_2, \ldots, h_n$ of the encoder 110. Herein, the number of hidden state vectors $h_j$ of the encoder 110 that are used when the decoder 120 determines the output token t may be defined as an attention weight $a_{ij}$, and a context vector of the output token $t_i$ may be defined as $\Sigma a_j h_j$.

The artificial neural network 100 for speech recognition may improve performance in speech recognition by additionally using a language model (LM) artificial neural network configured to predict a probability of a word sequence, in addition to the encoder 110 configured to receive the speech information 111 as an input and output the context vector 113 and the decoder 120 configured to receive the context vector 113 as an input and output a text, for example, a word sequence, which is a recognition result.

The LM artificial neural network may predict a probability of an entire sentence. In addition, when previous words are given, the LM artificial neural network may predict a probability of a word appearing subsequent to the words. The LM artificial neural network may be configured only by a decoder without an encoder, and perform training or learning only using a text.

When there are words pronounced the same or similar, the LM artificial neural network may enable more accurate recognition of such words. For example, when words "Minchul" and "feels" are given, the LM artificial neural network may determine that a probability of a word "happy" appearing subsequently is greater than a probability of a word "habit" appearing subsequently. To distinguish an operation performed by the decoder 120 of the artificial neural network 100 and an operation performed by the LM artificial neural network, a decoding operation to be performed by the decoder 120 of the artificial neural network 100 for speech recognition will be hereinafter referred to as a speech recognition task or a first decoding task, and a decoding operation to be performed by the LM artificial neural network will be hereinafter referred to as an LM task or a second decoding task.

The speech recognition task may process a relationship between a signal characteristic of a speech and a language element, and be a task of estimating a pronunciation of a speech signal, for example. The LM task may be a task of estimating a level of grammatical or semantic correctness of a word or a sentence.

Combining or adding the LM artificial neural network with or to the existing artificial neural network 100 for speech recognition may improve performance in speech recognition. In addition, the existing artificial neural network 100 for speech recognition may need a pair of a speech and a text corresponding to the speech for training or learning. However, it may be far smaller in amount compared to readily obtainable texts. Thus, by additionally training the LM artificial neural network that may be trained only with the texts, it is possible to supplement the performance in speech recognition. Hereinafter, a method that may improve performance in speech recognition while preventing increases in memory bandwidth and power consumption, by combining the LM artificial neural network with the existing artificial neural network 100, will be described.

Figure 2A:
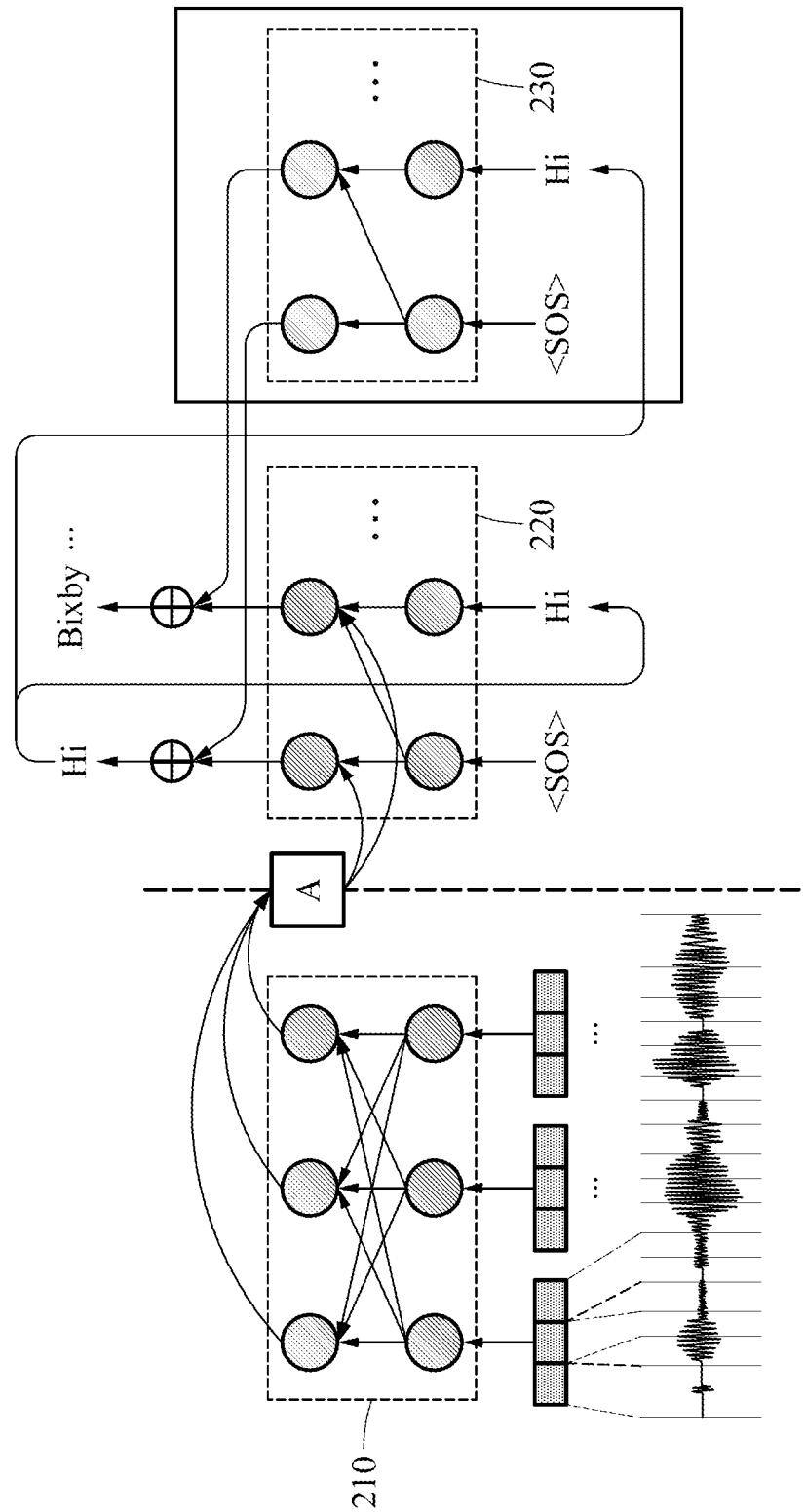
FIGS. 2A and 2B illustrate an example of combining a language model (LM) artificial neural network with an artificial neural network.
Figure 2B:
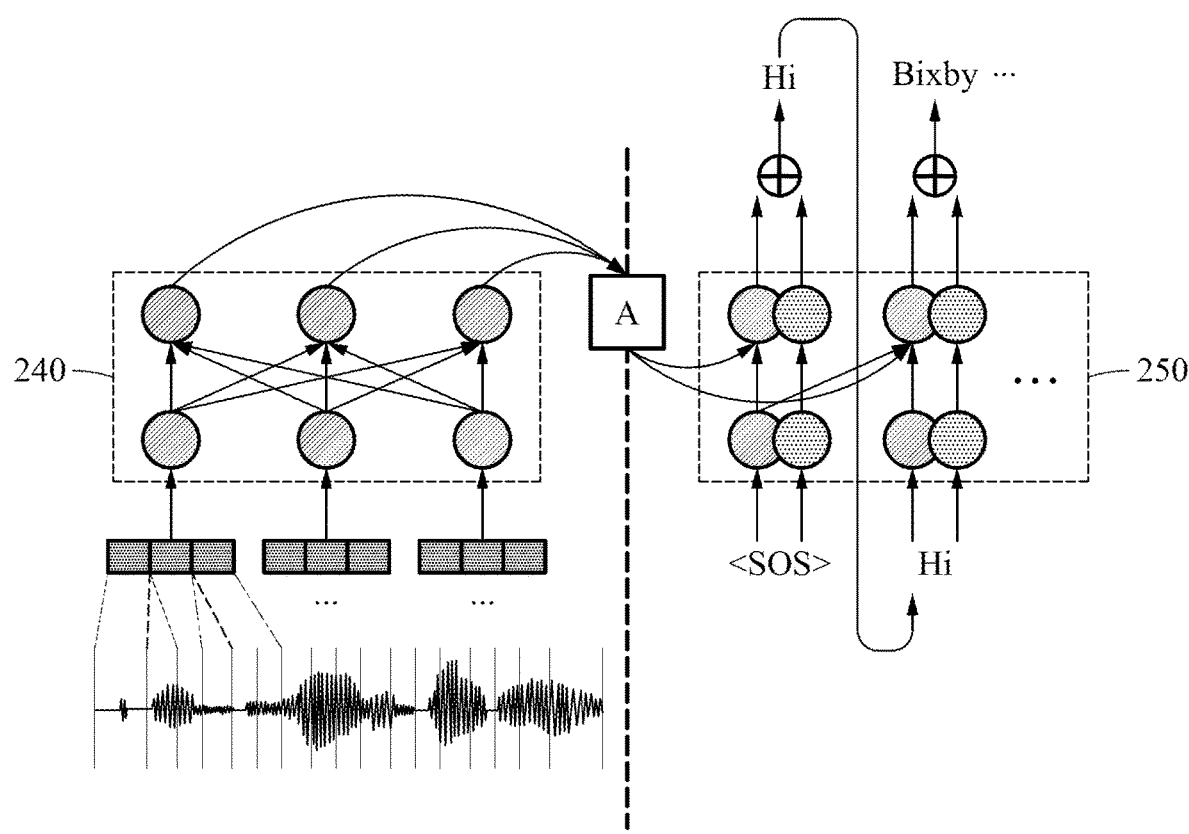

FIGS. 2A and 2B illustrate an example of combining an LM artificial neural network with an artificial neural network. Before describing a method of sharing a decoder according to an example, an existing method of combining an external LM artificial neural network with an artificial neural network will be described briefly with reference to FIG. 2A.

Referring to FIG. 2A, an artificial neural network includes an encoder 210, a decoder 220, and an external LM artificial neural network 230. The encoder 210 and the decoder 220 may be similar to the encoder 110 and the decoder 120 descried above with reference to FIG. 1.

The artificial neural network may perform speech recognition based on a combined operation of the decoder 220 and the LM artificial neural network 230. The decoder 220 and the LM artificial neural network 230 may output respective token-unit recognition results, and a final recognition result may be generated by combining the recognition results based on a weight. For example, the decoder 220 may determine candidates for an output token based on a context vector and at least one token recognized up to a current point in time, and the LM artificial neural network 230 may determine candidates for an output token based on at least one token recognized up to the current point in time. Subsequently, a final output token may be determined by combining the candidates for the output token based on a weight.

In everyday life, speech recognition may need to be suitable for privacy protection and need to be performed by or in a device on a palm of a hand of a user, irrespective of a network connection. For example, in an on-device environment in which speech recognition is performed at a device end, in lieu of a large-scale server, the speech recognition may be performed in a device of a user, and thus privacy may be protected without data leakage into an outside. In addition, in such on-device environment, although not being connected to a network, the speech recognition may be performed in real time without a delay.

The device used herein may encompass a digital device that includes a memory and a microprocessor and has a computational capacity, for example, a smartphone, a smart television (TV), artificial intelligence (AI) speaker, a navigation system, a digital TV (DTV), a wearable device, an electronics system, and a robot.

Using the external LM artificial neural network 230 may not be suitable for such on-device environment. When using the LM artificial neural network 230, performance in speech recognition may be improved. However, a size of an entire system may increase due to an addition of the LM artificial neural network 230 and an entire time used for the speech recognition may increase due to an operation time of the LM artificial neural network 230. In addition, the number of parameters to be determined by a human being to properly incorporate the separately trained two models into one model may increase.

To perform speech recognition at the device end, a parameter of the artificial neural network may need to be loaded onto a memory of the device. However, the addition of the LM artificial neural network 230 may increase a bandwidth for reading and writing the parameter in the memory, and increase power consumed for reading and writing the memory. In addition, the LM artificial neural network 230 may need to be trained separately from the existing artificial neural network.

Referring to FIG. 2B, a multitask artificial neural network according to an example includes an encoder 240 and a decoder 250, and both a speech recognition task and an LM task may be performed in the single decoder 250. The multitask artificial neural network may perform the speech recognition task and the LM task by the single decoder 250 that is shared for the tasks without using an external LM artificial neural network.

Since the multitask artificial neural network is configured to perform the two tasks through the sharing of the single decoder 250, a parameter, for example, a weight, for the LM artificial neural network may not need to be stored, and thus a size of an entire system may be reduced. In addition, using the multitask artificial neural network may increase a reuse rate of a parameter of a decoder that is loaded once for decoding, by using the parameter twice for the speech recognition task and the LM task. This may be advantageous to a general sequence generation model because it is not bound to calculations but to memory reads and writes. Such effect may be even greater when speech recognition is performed in a device with a limited amount and bandwidth of a memory that is loaded at one time. Hereinafter, a decoding method will be described in detail with reference to FIGS. 3 through 6, and a training method will be described in detail with reference to FIGS. 7 and 8.

Figure 3:
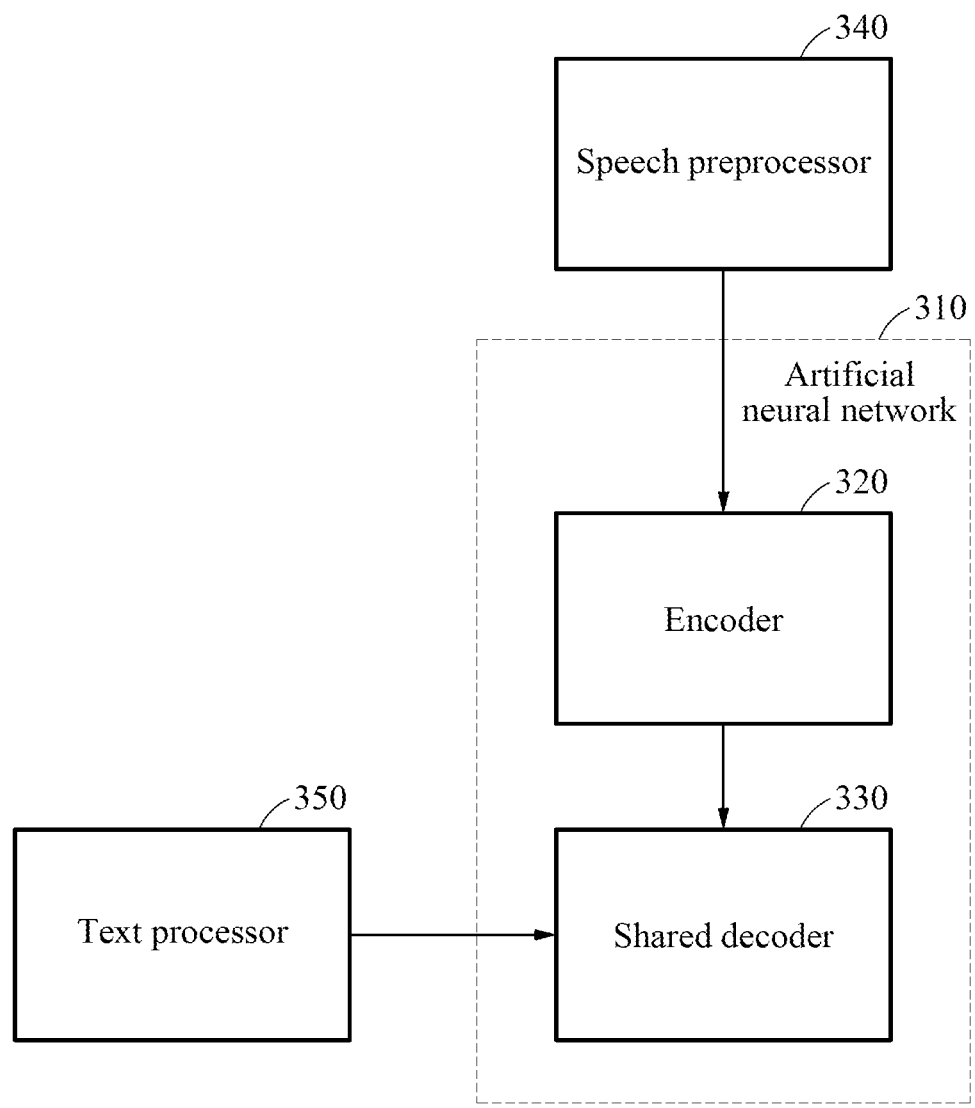
FIG. 3 illustrates an example of a speech recognition apparatus.

FIG. 3 illustrates an example of a speech recognition apparatus.

Referring to FIG. 3, a speech recognition apparatus includes an artificial neural network 310, a speech preprocessor 340, and a text processor 350. The artificial neural network 310 includes an encoder 320 and a shared decoder 330. The artificial neural network 310, the encoder 320, and the shared decoder 330 may be the multitask artificial neural network, the encoder 240, and the decoder 250, respectively, which are described above with reference to FIG. 2B.

The speech preprocessor 340 may preprocess an input of the artificial neural network 310 by, for example, removing noise included in speech information, or processing the speech information to be in a form suitable to be input to the artificial neural network 310. The speech preprocessor 340 may extract a speech feature vector from the speech information. For example, the speech preprocessor 340 may extract a feature by dividing a speech by a certain unit, for example, 25 milliseconds (ms), and configuring one frame while sliding to overlap a portion, for example, 15 ms. Subsequently, the speech preprocessor 340 may generate a speech feature vector to be input to the encoder 320 by connecting a preset number of feature frames, for example, three feature frames.

The text processor 350 may input, to the shared decoder 330, at least one token recognized up to a current point in time.

Although an example is described above with reference to FIG. 3, various technical modifications and changes may be applicable. For example, the decoder 330 may be a broader concept including the text processor 350.

Figure 4:
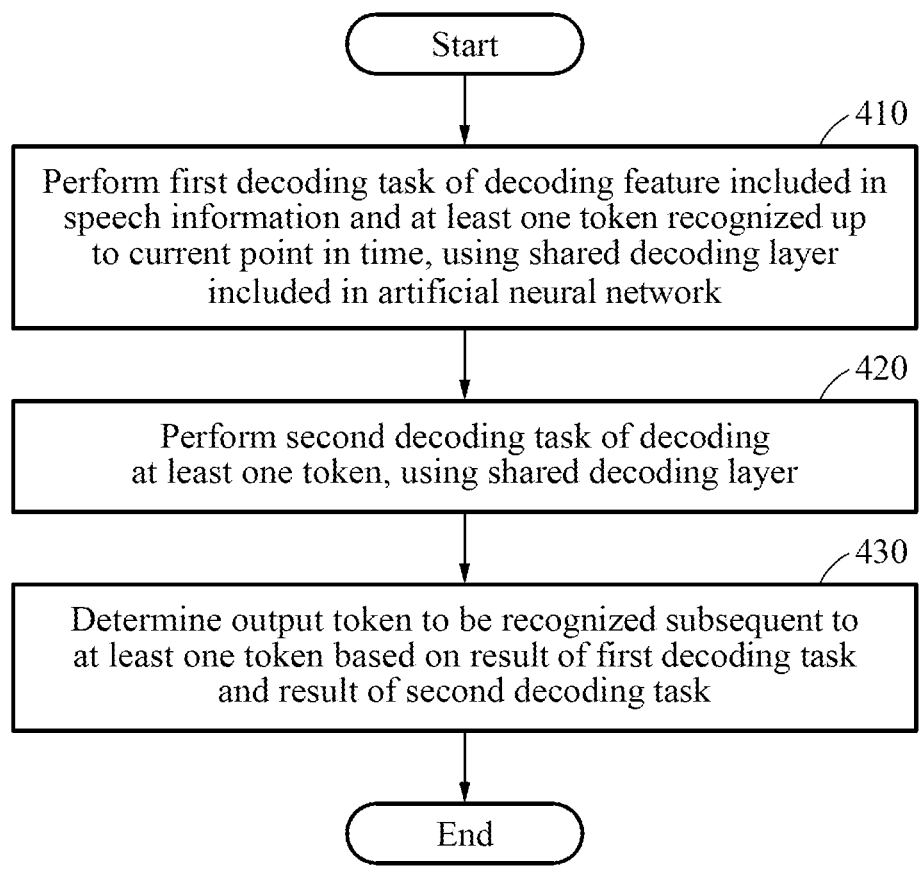
FIG. 4 illustrates a flowchart of an example of a decoding method.

FIG. 4 illustrates a flowchart of an example of a decoding method.

Operations 410 through 430 to be described hereinafter with reference to FIG. 4 may be performed by a shared decoder, for example, the shared decoder 330 described above with reference to FIG. 3. The shared decoder 330 may be embodied by one or more hardware modules or software modules, or various combinations thereof.

Referring to FIG. 4, in operation 410, the shared decoder performs a first decoding task of decoding a feature or a context vector that includes speech information, and at least one token recognized up to a current point in time, using a shared decoding layer. The shared decoder may be configured by a neural network including a plurality of layers among which a layer(s) commonly used for both a speech recognition task and an LM task is referred to as the shared decoding layer. The shared decoder may be entirely configured by the shared decoding layer, or only a portion of the shared decoder may be configured by the shared decoding layer.

In operation 420, the shared decoder performs a second decoding task of decoding the at least one token recognized up to the current point in time, using the shared decoding layer. The shared decoder may perform the LM task with a same parameter, using the shared decoding layer performing the first decoding task.

The shared decoder may simultaneously perform an existing function of a decoder of an artificial neural network to predict an output token using, as an input, a context vector received from an encoder and at least one token recognized up to a current point in time, and a function of an LM artificial neural network to predict an output token using, as an input, only the at least one token recognized up to the current point in time, without considering a context vector calculated from speech information.

The shared decoder may determine first probabilities of candidates for an output token based on the context vector and the at least one token recognized up to the current point, and second probabilities of the candidates for the output token based on the at least one token recognized up to the current point in time. The first probabilities may be determined as represented by Equation 1 above. The second probabilities may be determined as represented by Equation 2.

$$p(t_i|t_1,t_2,\ldots,t_{i-1}) \qquad \text{[Equation 2]}$$

The shared decoder may perform a plurality of tasks, for example, the first decoding task and the second decoding task, using a single decoder by adjusting a weight of a synapse connecting a neuron corresponding to the context vector and the shared decoding layer. When performing the first decoding task, the shared decoder may adjust, to be a first value, the weight of the synapse connecting the neuron corresponding to the context vector and the shared decoding layer. When performing the second decoding task, the shared decoder may adjust, to be a second value, the weight of the synapse connecting the neuron corresponding to the context vector and the shared decoding layer.

Since, when performing the first decoding task, the shared decoder determines the first probabilities of the candidates for the output token by considering the context vector, the shared decoder may adjust, to be a value greater than or equal to a preset threshold, the weight of the synapse connecting the neuron corresponding to the context vector and the shared decoding layer. For example, the shared decoder may adjust the weight of the synapse connecting the neuron corresponding to the context vector and the shared decoding layer such that the context vector is input to a decoder, for example, to be 1.

Since, when performing the second decoding task, the shared decoder determines the second probabilities of the candidates for the output token without considering the context vector, the shared decoder may adjust, to be a value less than the preset threshold, the weight of the synapse connecting the neuron corresponding to the context vector and the shared decoding layer. For example, the shared decoder may adjust the weight of the synapse connecting the neuron corresponding to the context vector and the shared decoding layer such that the context vector does not affect the decoder, for example, to be 0.

In operation 430, the shared decoder determines an output token to be recognized subsequent to the at least one token, based on a result of the first decoding task and a result of the second decoding task. The shared decoder may calculate a weighted sum of the first probabilities and the second probabilities and determine, to be the output token, a candidate corresponding to a maximum weighted sum among the candidates for the output token. For example, as a result of the first decoding task, "Bixby" and "Vixby," which are the candidates for the output token, may have first probabilities of 0.79 and 0.81, respectively. In addition, as a result of the second decoding task, "Bixby" and "Vixby" may have second probabilities of 0.85 and 0.12, respectively. In this example, a weight between a first probability and a second probability may be 1:0.2. In this example, a weighted sum for each of "Bixby" and "Vixby" may be 0.96 and 0.834, respectively. Thus, in this example, the shared decoder may determine, to be the output token, "Bixby" corresponding to a maximum weighted sum. The weight between the first probability and the second probability may be a predefined value, or learned or trained through a gate. Hereinafter, how a weight is learned or trained will be described in detail with reference to FIG. 7.

Figure 5:
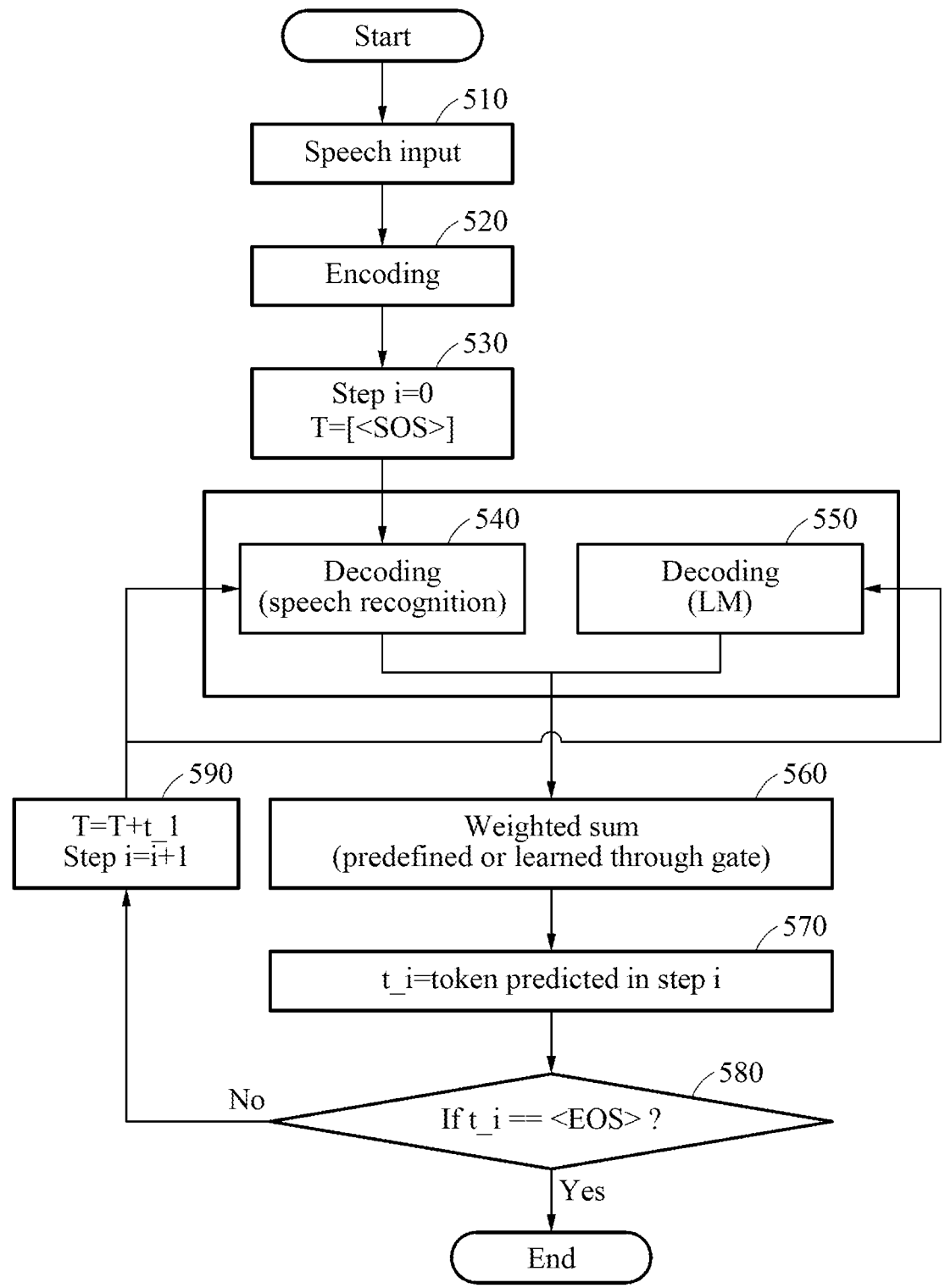
FIG. 5 illustrates a flowchart of an example of a speech recognition method.

FIG. 5 illustrates a flowchart of an example of a speech recognition method.

Operations 510 through 590 to be described hereinafter with reference to FIG. 5 may be performed by the speech recognition apparatus described above with reference to FIG. 3.

Referring to FIG. 5, in operation 510, the speech recognition apparatus receives a speech as an input. A user may utter a speech, and the speech recognition apparatus may receive the speech uttered by the user as an input. The speech received by the speech recognition apparatus may also be referred to as speech information or a speech signal.

In operation 520, the speech recognition apparatus encodes the speech information and generates a context vector.

In operation 530, the speech recognition apparatus initializes a time step i, and sets a start token SOS which indicates a start of a sentence as an initial input in the time step i.

In operation 540, the speech recognition apparatus performs a first decoding task. The speech recognition apparatus decodes the context vector and at least one token recognized up to a current point in time.

In operation 550, the speech recognition apparatus performs a second decoding task. The speech recognition apparatus decodes the at least one token recognized up to the current point in time.

In operation 560, the speech recognition apparatus calculates a weighted sum of first probabilities and second probabilities of candidates for an output token based on a result of the first decoding task and a result of the second decoding task.

In operation 570, the speech recognition apparatus determines the output token in the time step i. As described above, the speech recognition apparatus determines, to be the output token, a candidate corresponding to a maximum weighted sum among the candidates for the output token.

In operations 580 and 590, the speech recognition apparatus adds a time step by 1 and repeats operations 540 through 570 until the output token in the time step i, or an end token EOS indicating an end of the sentence, is predicted as a subsequent word.

Figure 6:
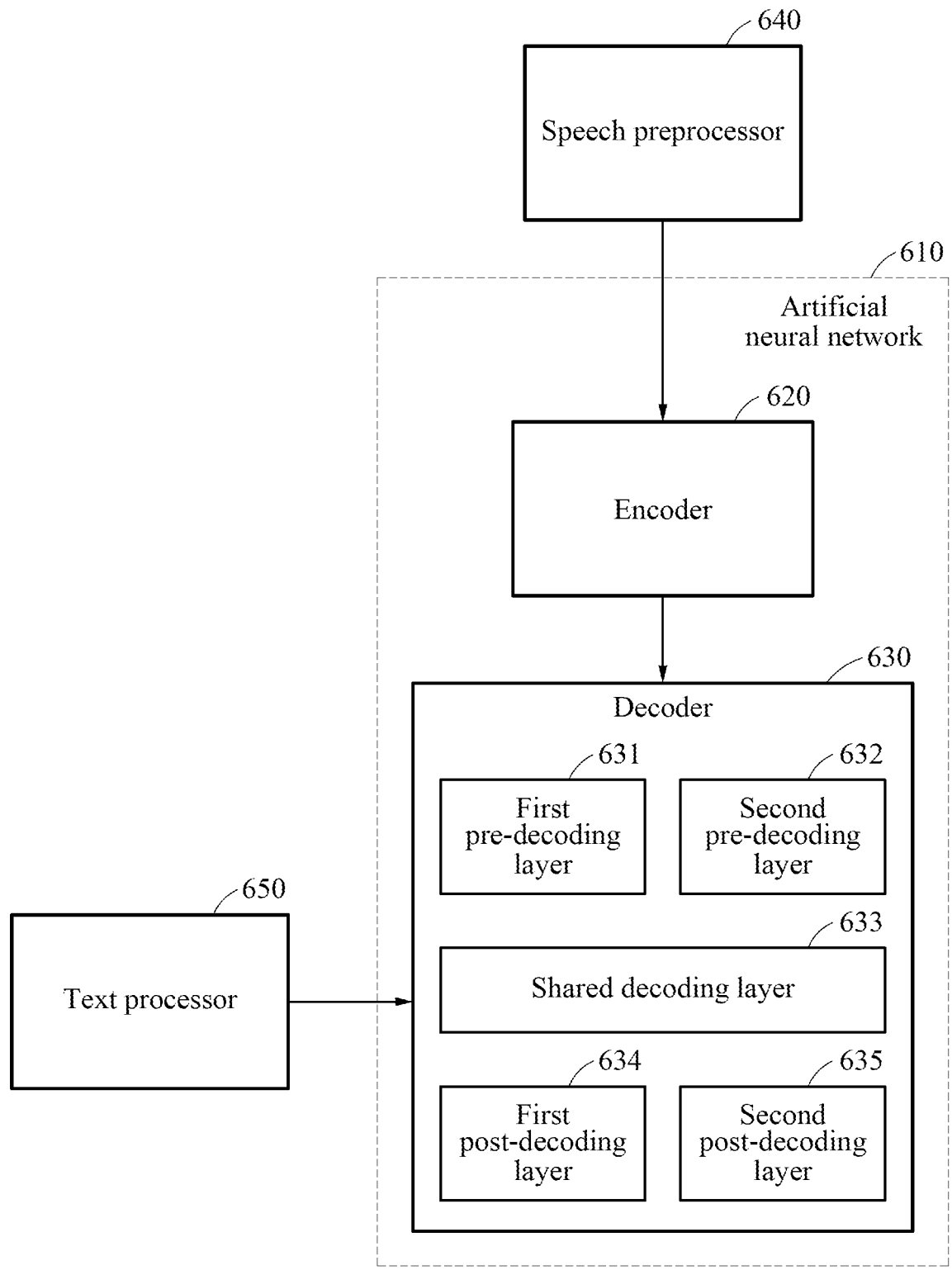
FIG. 6 illustrates an example of a speech recognition apparatus including a decoder sharing a portion of a decoding layer.

FIG. 6 illustrates an example of a speech recognition apparatus including a decoder sharing a portion of a decoding layer.

Referring to FIG. 6, a speech recognition apparatus includes an artificial neural network 610, a speech preprocessor 640 and a text processor 650. The artificial neural network 610 includes an encoder 620 and a decoder 630. The encoder 620, the speech preprocessor 640, and the text processor 650 may be the encoder 320, the speech preprocessor 340, and the text processor 350 described above with reference to FIG. 3.

The decoder 630 may use only a portion of a plurality of layers as a shared decoding layer 633. For example, the decoder 630 may have a decoding layer for a speech recognition task and a decoding layer for an LM task, separately, in a front portion of the decoder 630 configured to receive a context vector from the encoder 620 or in a rear portion of the decoder 630 configured to output a recognition result.

As illustrated, the decoder 630 performs a first decoding task by inputting a context vector and at least one token recognized up to a current point in time to a first pre-decoding layer 631 for a speech recognition task, and inputting an output of the first pre-decoding layer 631 to the shared decoding layer 633. In addition, the decoder 630 performs a second decoding task by inputting the at least one token recognized up to the current point to a second pre-decoding layer 632 for an LM task, and inputting an output of the second pre-decoding layer 632 to the shared decoding layer 633.

Alternatively, the decoder 630 performs the first decoding task by inputting the context vector and the at least one token recognized up to the current point to the shared decoding layer 633, and inputting an output of the shared decoding layer 633 to a first post-decoding layer 634 for the speech recognition task. In addition, the decoder 630 performs the second decoding task by inputting the at least one token recognized up to the current point to the shared decoding layer 633, and inputting an output of the shared decoding layer 633 to a second post-decoding layer 635 for the LM task.

Alternatively, the decoder 630 performs the first decoding task by inputting the context vector and the at least one token recognized up to the current point to the first pre-decoding layer 631 for the speech recognition task, inputting an output of the first pre-decoding layer 631 to the shared decoding layer 633, and inputting an output of the shared decoding layer 633 to the first post-decoding layer 634. In addition, the decoder 630 performs the second decoding task by inputting the at least one token recognized up to the current point to the second pre-decoding layer 632 for the LM task, inputting an output of the second pre-decoding layer 632 to the shared decoding layer 633, and inputting an output of the shared decoding layer 633 to the second post-decoding layer 635.

When using only a portion of a plurality of layers as a shared decoding layer, a part or an area corresponding to the shared decoding layer may be reduced. However, there may be respective areas or parts for two different tasks, and thus performance may be improved at the expense of a model size.

Figure 7:
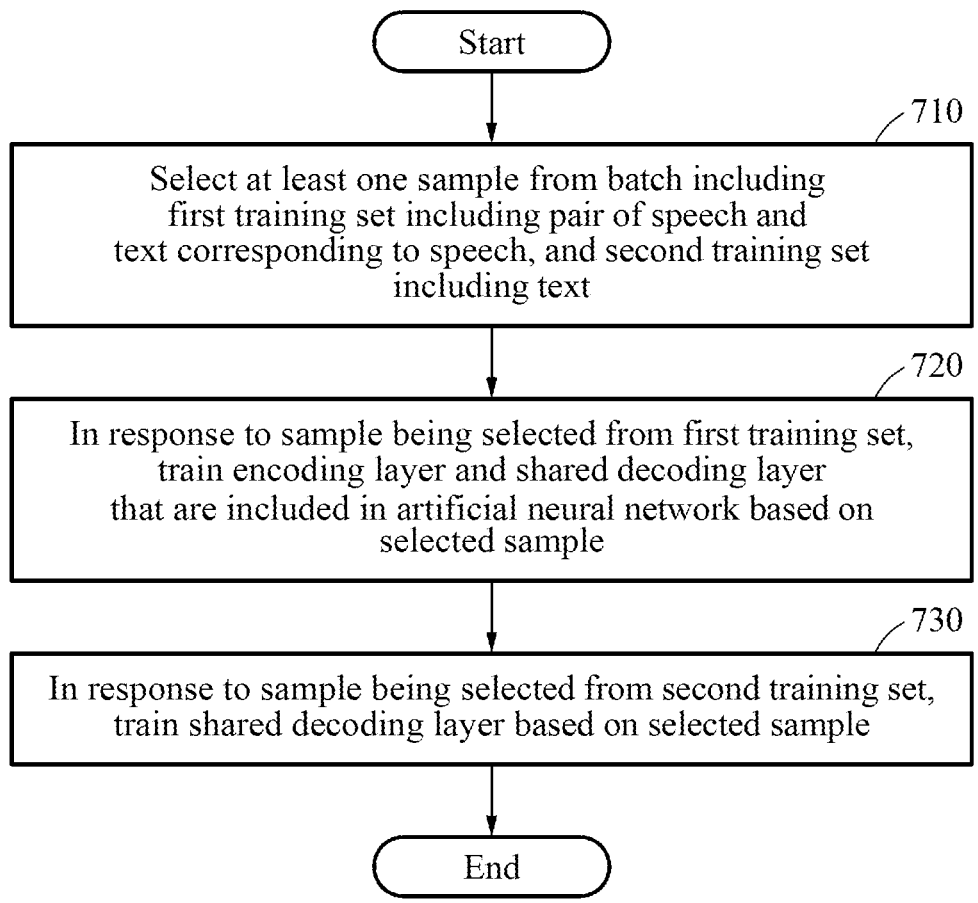
FIGS. 7 and 8 illustrate an example of training an artificial neural network for speech recognition.
Figure 8:
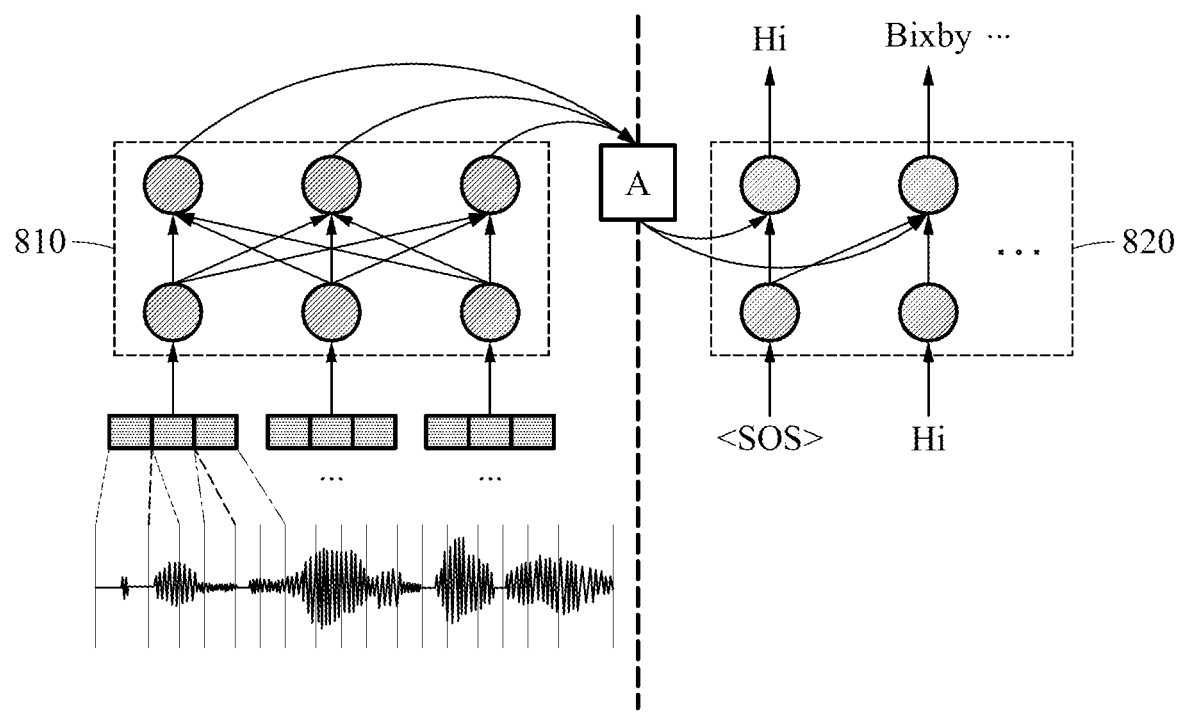

FIGS. 7 and 8 illustrate an example of training an artificial neural network for speech recognition.

Operations 710 through 730 to be described hereinafter with reference to FIG. 7 may be performed by a speech recognition training apparatus.

Referring to FIG. 7, in operation 710, the training apparatus selects at least one sample from a batch including a first training set including a pair of a speech and a text corresponding to the speech, and a second training set including a text. The batch may include the first training set and the second training set at a preset ratio or proportion.

The sample may be data used to train an artificial neural network for speech recognition, and referred to as a training sample herein. A speech included in the first training set may be embodied in various forms, for example, speech information or a speech signal, data obtained by preprocessing the speech information, a feature or a feature vector of the speech information, and a phone or a senone in each frame of the speech information. A type of the sample may not be limited to a certain one. The sample of the speech information may be defined or designed to be various forms or types, for example, a word, a phoneme, a morpheme, a phonetic symbol unit, a phrase, a passage, a paragraph, a sentence, and the like, based on a design intent.

In operation 720, in response to the sample being selected from the first training set, the training apparatus trains an encoding layer and a shared decoding layer that are included in an artificial neural network based on the selected sample. For example, the training apparatus uses the encoding layer to extract a feature from a speech included in the sample. Based on the extracted feature and at least one token, the training apparatus uses the shared decoding layer to estimate an output token to be recognized subsequent to the at least one token. Subsequently, based on the estimated output token and at least a portion of a text corresponding to the speech included in the sample, the training apparatus trains the encoding layer and the shared decoding layer. For example, the training apparatus performs such training to increase a correlation between the estimated output token and the at least a portion of the text corresponding to the speech included in the sample.

In operation 730, in response to the sample being selected from the second training set, the training apparatus trains the shared decoding layer based on the selected sample. For example, the training apparatus uses a decoding layer to estimate an output token to be recognized subsequent to at least one token based on the at least one token, and trains the shared decoding layer based on the estimated output token and at least a portion of a text included in the sample.

Referring to FIG. 8, when a sample is selected from a second training set only including a text, the training apparatus trains only a decoding layer included in a decoder 820, by preventing a gradient from flowing into an encoder 810.

When the sample is selected from a first training set, the training apparatus may further train only the decoding layer once more by preventing a gradient from flowing towards the encoder 810, only with a text in a pair of a speech and a text corresponding to the speech.

The training apparatus may include a gate to determine a flow of a gradient, and train the gate. In addition, the training apparatus may train or learn an attention weight.

In addition, the training apparatus may train or learn a weight between first probabilities and second probabilities. For example, the training apparatus selects a sample from a first training set, extracts a feature from a speech included in the sample using an encoding layer, estimates first probabilities of candidates for an output token to be recognized subsequent to at least one token based on the extracted feature and the at least one token using a shared decoding layer, estimates second probabilities of the candidates for the output token to be recognized subsequent to the at least one token based on the at least one token using the shared decoding layer, estimates the output token based on a weight between the first probabilities and the second probabilities, and trains or learns the weight based on at least a portion of a text corresponding to the speech included in the sample.

Figure 9:
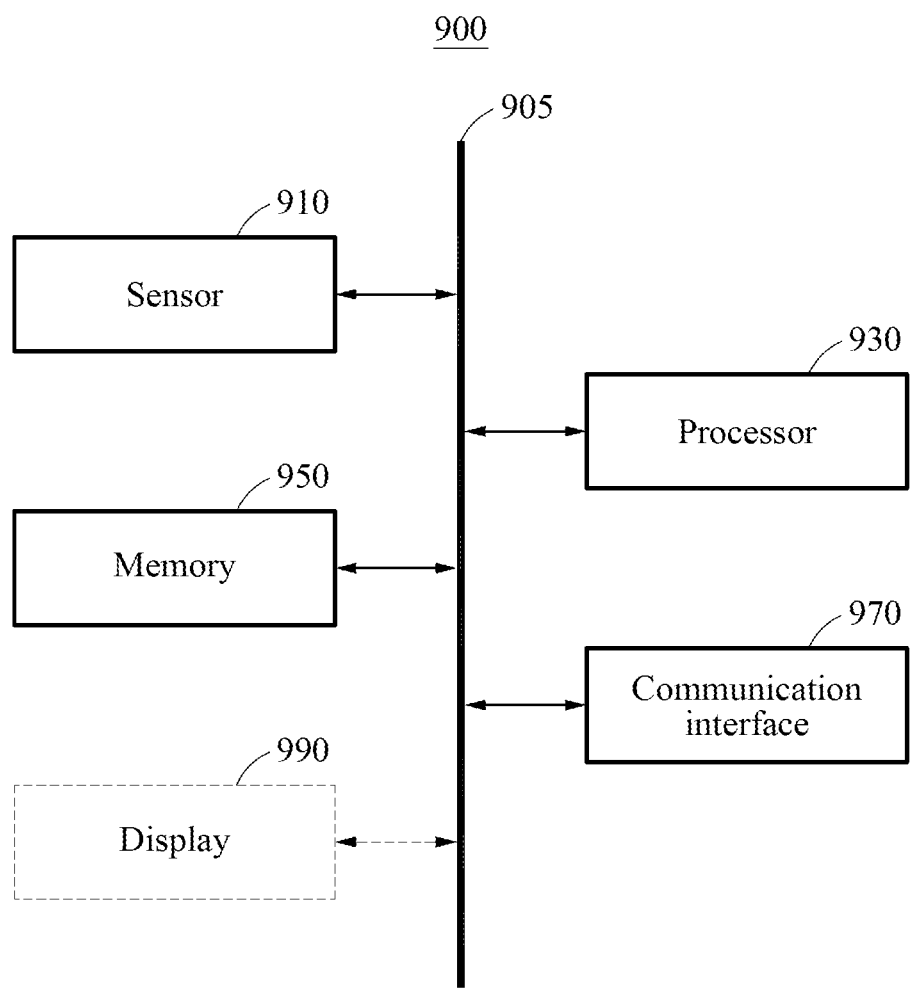
FIG. 9 illustrates an example of a speech recognition apparatus.

FIG. 9 illustrates an example of a speech recognition apparatus.

Referring to FIG. 9, a speech recognition apparatus 900 includes a sensor 910, a processor 930, and a communication interface 970. The speech recognition apparatus 900 further includes a memory 950 and a display 990. The sensor 910, the processor 930, the memory 950, the communication interface 970, and the display 990 may communicate with one another through a communication bus 905.

The sensor 910 may include, for example, a micro-sensor and a voice sensor.

The processor 930 may perform one or more of operations or methods described above with reference to FIGS. 1 through 6, and algorithms corresponding to the operations or methods. The processor 930 may execute a program and control the speech recognition apparatus 900. A code of the program to be executed by the processor 930 may be stored in the memory 950.

The processor 930 may be configured as a central processing unit (CPU) or a graphics processing unit (GPU), for example.

The processor 930 may generate a feature from speech information, perform a first decoding task of decoding the feature and at least one token recognized up to a current point in time, perform a second decoding task of decoding the at least one token recognized up to the current point, and determine an output token to be recognized subsequent to the at least one token based on a result of the first decoding task and a result of the second decoding task.

The memory 950 may store data processed by the processor 930. For example, the memory 950 may store the program. The program to be stored may be a set of syntaxes to be coded to be executable by the processor 930 such that speech recognition is performed. The memory 950 may be a volatile or nonvolatile memory.

The communication interface 970 may be connected to the sensor 910, the processor 930, and the memory 950, to transmit and receive data. The communication interface 970 may be connected to another external device to transmit and receive data. Hereinafter, the expression "transmit and receive A" may indicate transmit and receive information or data that indicates A.

The communication interface 970 may be embodied by a circuitry in the speech recognition apparatus 900. For example, the communication interface 970 may include an internal bus and an external bus. As another example, the communication interface 970 may be an element connecting the speech recognition apparatus 900 and the external device. In this example, the communication interface 970 may receive data from the external device, and transmit the received data to the processor 930 and the memory 950.

The display 990 may display a result from the decoding, for example, a speech recognition result.

Although not illustrated, a speech recognition training apparatus may include a sensor, a processor, and a communication interface. The training apparatus may further include a memory and a display. The sensor, the processor, the memory, the communication interface, and the display may communicate with one another through a communication bus.

The sensor may include, for example, a micro-sensor and a voice sensor.

The processor may perform one or more of operations or methods described above with reference to FIGS. 7 and 8, and algorithms corresponding to the operations or methods. The processor may execute a program and control the training apparatus in an artificial neural network. A code of the program to be executed by the processor may be stored in the memory.

The processor may be configured as a CPU or a GPU, for example.

The processor may select at least one sample from a batch including a first training set including a pair of a speech and a text corresponding to the speech, and a second training set including a text. When the sample is selected from the first training set, the processor may train an encoding layer and a shared decoding layer included in the artificial neural network based on the selected sample. When the sample is selected from the second training set, the processor may train the shared decoding layer based on the selected sample.

The memory may store data processed by the processor. For example, the memory may store the program. The program to be stored may be a set of syntaxes to be coded to be executable by the processor such that speech recognition is performed. The memory may be a volatile or nonvolatile memory.

The communication interface may be connected to the sensor, the processor, and the memory, to transmit and receive data. The communication interface may be connected to another external device to transmit and receive data.

The communication interface may be embodied by a circuitry in the training apparatus. For example, the communication interface may include an internal bus and an external bus. For another example, the communication interface may be an element connecting the training apparatus and the external device. In this example, the communication interface may receive data from the external device, and transmit the received data to the processor and the memory.

The speech recognition apparatus, the speech recognition training apparatus, and other apparatuses, units, modules, devices, and other components described herein with respect to FIGS. 1, 2A-2B, 3, 6, 8, and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 5, and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A decoding method in a trained artificial neural network for speech recognition, the decoding method comprising:
    performing a first decoding task of decoding a feature including speech information and at least one token recognized up to a current point in time, using a first pre-decoding layer and a shared decoding layer included in the artificial neural network, an output node of the first pre-decoding layer being connected to an input node of the shared decoding layer, wherein the feature further includes context vector being determined using an attention network based on sequence vectors associated with a progress of the speech information;
    performing a second decoding task of decoding the at least one token using a second pre-decoding layer and the shared decoding layer, an output node of the second pre-decoding layer being connected to another input node of the shared decoding layer; and
    determining an output token to be recognized subsequent to the at least one token based on a result of the first decoding task and a result of the second decoding task.

2. The decoding method of claim 1, wherein the performing the first decoding task comprises:
    adjusting, to be a first value, a weight of a synapse connecting the shared decoding layer and a neuron corresponding to the feature, and
    the performing of the second decoding task comprises:
    adjusting the weight of the synapse to be a second value.

3. The decoding method of claim 1, wherein the performing the first decoding task comprises:
    inputting, to the shared decoding layer, the feature and the at least one token recognized up to the current point, and
    the performing of the second decoding task comprises:
    inputting, to the shared decoding layer, the at least one token recognized up to the current point.

4. The decoding method of claim 1,
    wherein the performing the first decoding task comprises:
    inputting, to the first pre-decoding layer, the feature and the at least one token recognized up to the current point; and
    inputting an output of the first pre-decoding layer to the shared decoding layer to perform the first decoding task, and
    wherein the performing the second decoding task comprises:
    inputting, to the second pre-decoding layer, the at least one token recognized up to the current point; and
    inputting an output of the second pre-decoding layer to the shared decoding layer to perform the second decoding task.

5. The decoding method of claim 1, wherein the performing the first decoding task comprises:
    inputting, to the shared decoding layer, the feature and the at least one token recognized up to the current point; and
    inputting an output of the shared decoding layer to a first post-decoding layer to perform the first decoding task, and
    the performing the second decoding task comprises:
    inputting, to the shared decoding layer, the at least one token recognized up to the current point; and inputting an output of the shared decoding layer to a second post-decoding layer to perform the second decoding task.

6. The decoding method of claim 1, wherein the result of the first decoding task includes first probabilities of candidates for the output token, and
the result of the second decoding task includes second probabilities of the candidates for the output token.

7. The decoding method of claim 1, further comprising:
determining the output token to be a subsequent input token.

8. The decoding method of claim 1, further comprising:
generating the feature by encoding the speech information using an encoding layer included in the artificial neural network.

9. A non-transitory computer-readable storage medium storing instructions that, when executed by a processor, cause the processor to perform a method comprising:
performing a first decoding task of decoding a feature including speech information and at least one token recognized up to a current point in time, using a first pre-decoding layer and a shared decoding layer included in the artificial neural network, an output node of the first pre-decoding layer being connected to an input node of the shared decoding layer, wherein the feature further includes context vector being determined using an attention network based on sequence vectors associated with a progress of the speech information;
performing a second decoding task of decoding the at least one token using a second pre-decoding layer and the shared decoding layer, an output node of the second pre-decoding layer being connected to another input node of the shared decoding layer; and
determining an output token to be recognized subsequent to the at least one token based on a result of the first decoding task and a result of the second decoding task.

10. An apparatus, using a trained artificial neural network, comprising:
an encoder configured to generate a feature from speech information, wherein the feature further includes context vector being determined using an attention network based on sequence vectors associated with a progress of the speech information; and
a decoder configured to, using a first pre-decoding layer, a second pre-decoding layer and a shared decoding layer, perform a first decoding task of decoding the feature and at least one token recognized up to a current point in time, perform a second decoding task of decoding the at least one token recognized up to the current point, and determine an output token to be recognized subsequent to the at least one token based on a result of the first decoding task and a result of the second decoding task,
wherein an output node of the first pre-decoding layer is connected to an input node of the shared decoding layer, and an output node of the second pre-decoding layer is connected to another input node of the shared decoding layer.

11. The apparatus of claim 10, further comprising:
a preprocessor configured to extract a feature vector from the speech information,
wherein the encoder is configured to generate the feature based on the feature vector.

12. The apparatus of claim 10, wherein the decoder is configured to:
perform the first decoding task by adjusting, to be a first value, a weight of a synapse connecting the shared decoding layer and a neuron corresponding to the feature; and
perform the second decoding task by adjusting the weight of the synapse to be a second value.

13. The apparatus of claim 10, wherein the decoder is configured to:
perform the first decoding task by receiving, through the shared decoding layer, the feature and the at least one token recognized up to the current point; and
perform the second decoding task by receiving, through the shared decoding layer, the at least one token recognized up to the current point.

14. The recognition apparatus of claim 10, wherein the decoder is configured to:
perform the first decoding task by receiving the feature and the at least one token recognized up to the current point through the first pre-decoding layer, and receiving an output of the first pre-decoding layer through the shared decoding layer; and
perform the second decoding task by receiving the at least one token recognized up to the current point through the second pre-decoding layer, and receiving an output of the second pre-decoding layer through the shared decoding layer.

* * * * *